United States Patent
Voyer

(10) Patent No.: US 6,748,241 B2
(45) Date of Patent: Jun. 8, 2004

(54) DYNAMIC ANTENNA INCLINATION CONTROL METHOD FOR A RADIOTELECOMMUNICATION SYSTEM

(75) Inventor: Nicolas Voyer, Rennes (FR)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 564 days.

(21) Appl. No.: 09/816,098

(22) Filed: Mar. 26, 2001

(65) Prior Publication Data

US 2001/0051532 A1 Dec. 13, 2001

(30) Foreign Application Priority Data

Mar. 27, 2000 (FR) .............................. 00 03997

(51) Int. Cl.[7] ................................. H04Q 7/20
(52) U.S. Cl. .................... 455/562.1; 455/63.4; 455/82; 455/83; 342/75
(58) Field of Search ............... 455/25, 562.1, 455/63.4, 19, 82, 83, 29; 342/75, 359, 372, 368, 159, 149

(56) References Cited

U.S. PATENT DOCUMENTS 5,551,060 A * 8/1996 Fujii et al. ................ 455/447
5,805,996 A * 9/1998 Salmela ..................... 455/453
6,104,936 A * 8/2000 Kronestedt ............... 455/562.1
6,282,434 B1 * 8/2001 Johannisson et al. .... 455/562.1

FOREIGN PATENT DOCUMENTS

| JP | 9-154168 | 6/1997 |
| JP | 9-298766 | 11/1997 |
| WO | WO 93/12587 | 6/1993 |

* cited by examiner

Primary Examiner—Vivian Chin
Assistant Examiner—Sanh Phu
(74) Attorney, Agent, or Firm—Oblon, Spivak, McClelland, Maier & Neustadt, P.C.

(57) ABSTRACT

A method for determining an antenna beam angle for base stations of a radiotelecommunication system, notably of the cellular mobile radiotelephony system type. Each of the base stations defines a cell and has a transmission and reception antenna whose beam covers a sector in which mobile units can communicate with the base station. The antenna beam can be inclined, so as to modify the sector covered, via a dynamic antenna beam inclination control method. That method includes the steps of determining, a priori, an optimum inclination that is optimum in relation to the sector covered; estimating a cell load of the cell at a given instant; determining an instantaneous inclination at the given instant, as a function of the optimum inclination and the estimated load; controlling an instantaneous inclination of the antenna as a function of the instantaneous inclination determined.

16 Claims, 2 Drawing Sheets

DYNAMIC ANTENNA INCLINATION CONTROL METHOD FOR A RADIOTELECOMMUNICATION SYSTEM

BACKGROUND OF THE INVENTION

1. Field of the Invention

The present invention concerns in general terms a method for the dynamic control of the inclination of an antenna for a radiotelecommunication system, notably for a cellular mobile radiotelephony system.

2. Description of Related Art

A radiotelecommunication system of the cellular mobile radiotelephony type has, as is well known, a plurality of fixed base stations communicating with a plurality of mobile units. Each of the base stations, defining a cell, covers a geographical area in which the mobile units can communicate with this base station. This geographical area is referred to as a sector.

It is well known that the sector is determined by the antenna parameters of the base station and notably by the position parameters of this antenna with respect to its immediate environment. Naturally, the height of the antenna with respect to the ground is an important parameter in determining the sector. However, another important parameter is the inclination of the antenna in a vertical plane. Normally, the antenna extends in a horizontal direction, that is to say the axis of the antenna beam is horizontal. The antenna can however be inclined in a vertical plane, that is to say the axis of the main antenna beam can be inclined by a certain angle upwards or downwards.

It is well known, as described, for example, in international patent application WO 97/29557 or in international patent application WO 99/17576, that inclining the antenna downwards notably reduces the problems of interference between cells using identical or adjacent frequencies. This is because the signals emitted by a downward-inclined inclined antenna are weaker at a great distance from the antenna than when they are emitted by a horizontal antenna, whilst they remain identical or even more intense close to the antenna. FIG. 1 shows an example of the impact of the inclination of the antenna downwards on the coverage of the cell. An antenna 10 whose lobe is directed horizontally emits a main beam 12. The result is a coverage area or sector 11. An antenna 20 which is identical but whose lobe is inclined downwards in a vertical plane by an angle of inclination θ emits a main beam 22. The result is a coverage area or sector 21. As can be seen in FIG. 1, the sector 21 is reduced, with respect to the sector 11, in the direction of the axis of the main beam where the interference with adjacent cells is the greatest. On the other hand, the coverage of the area served by the antenna remains assured and is even increased. The interference produced by one cell on adjacent cells can therefore be thus advantageously reduced.

BRIEF SUMMARY OF THE INVENTION

By inclining the antenna upwards, it is notably possible to reduce the screen phenomena occasioned notably by buildings situated close to the antenna. By inclining the antenna, and therefore the axis of the main beam, upwards, it can be ensured that a major part of the beam avoids the building. Because of electromagnetic diffraction, the coverage area can then extend behind the building. FIG. 2 shows an example of the impact of inclining the antenna upwards on the coverage of the cell. An antenna 30 whose lobe is directed horizontally emits a main beam 32. This beam strikes a building 33, which cuts it. This results in a coverage area or sector 31 limited to the area situated between the antenna 30 and the building 33. An antenna 40 which is identical but whose lobe is inclined upwards in a vertical plane by an angle of inclination θ emits a main beam 42 which for the major part passes over a building 43 identical to the building 33. The electromagnetic diffraction means that an area situated behind the building is covered. The result is a coverage area or sector 41 consisting of an area 41A situated between the antenna 40 and the building 43 and an area 41B situated behind the building 43.

It is known that it is possible to determine, for each antenna in a communication system, an optimum inclination for obtaining optimum coverage. This determination can notably be achieved through a knowledge of the topology of the area served and a simulation of the electromagnetic propagation conditions.

However, in cellular mobile radiotelephony systems of the type based on code distribution multiple access (CDMA), for example, such an a priori determination of the optimum antenna inclination is not satisfactory. The CDMA technique is an example of a technique used for resolving the problems posed by the increasing number of users of cellular mobile radiotelephony systems. In this modulation technique, the frequency spectrum can be reused many times, which increases the capacity of the system. Determining the coverage necessary, in the context of such a technique, is difficult. According to the capacity of the cell, that is to say the number of users present in the cell, the coverage can be greater or lesser.

When the cell is highly loaded, that is to say when there are a large number of users present in the cell, the transmission power of the base station must be shared between a large number of signals. Consequently the coverage is reduced. This phenomenon is well known in the art of cellular mobile radiotelephony systems using the technique of code distribution multiple access (CDMA) by the name of cell respiration. In addition, interference with adjacent cells is then a limiting factor in relation to the total capacity of the system.

Generally, a telecommunications system offers uniformity of traffic neither in space nor in time. The compromise to be achieved between coverage and capacity within a cell seems to be very difficult to achieve a priori.

The object of the present invention is notably to resolve the above problems.

To this end, it proposes a dynamic antenna inclination control method for a radiotelecommunication system, notably of the cellular mobile radiotelephony system type, the radiotelecommunication system including a plurality of fixed base stations communicating with a plurality of mobile units, each of the base stations defining a cell and having a transmission and reception antenna whose beam covers a sector in which the mobile units can communicate with the base station, the antenna being able to be inclined so as to modify the sector covered, the method including a step of priori determination of antenna inclination consisting of determining an inclination of the antenna which is optimum in relation to the sector covered, a step of dynamic estimation of cell load consisting of estimating a load on the cell at a given instant, an instantaneous inclination determination step consisting of determining, at the given instant, as a function of the optimum antenna inclination determined and the estimated load, an instantaneous inclination, and an antenna inclination control step consisting of controlling the inclination of the antenna as a function of the determined instantaneous inclination.

Thus it is possible to dynamically adjust the inclination of the antenna as a function of the load constraints estimated in real time. The inclination of the antenna is then regularly changed so as to establish the best compromise between coverage and capacity.

According to another aspect of the present invention, the inclination of the antenna tends towards the optimum inclination when the load is low.

When the cell is lightly loaded, that is to say when the number of users present in the cell is low, it is preferable for the coverage area to be at a maximum, so as to best cover the remote areas. The inclination used will then often be close to zero, that is to say the antenna will be directed substantially horizontally, except if it is necessary, for example, to avoid buildings, in which case it will be inclined upwards.

On the other hand, the more the load increases, the more the inclination of the antenna moves away from the optimum inclination and a horizontal inclination.

When the cell is more heavily loaded, the phenomenon of cell respiration means that the coverage must be reduced. Interference with adjacent cells also becomes a limiting factor in relation to the total capacity of the system. According to the invention, the coverage is then deliberately limited by increasing the inclination compared with the optimum inclination, that is to say by moving away still further from the horizontal, and then the surrounding cells must take over for coverage of the remote areas which are then less well covered. The decrease in coverage does not pose any problem because, the less interference the surrounding cells suffer from the cell under consideration, the better they are able to take over the coverage.

The method according to the invention is therefore better adapted to cases where the loads on adjacent cells are not uniform. The more unbalanced these loads, the more effective the method, which is the case, notably, when the geographical distribution of the base stations is not adapted to the geographical distribution of the traffic or when the geographical distribution of the traffic varies over time.

Thus according to another aspect of the present invention, the dynamic antenna inclination control method also comprises a step of dynamic estimation of load imbalance between cells consisting of estimating, at the given instant, the load imbalance between the cell and the adjacent cells, the instantaneous inclination determination step determining the instantaneous inclination also as a function of the estimated load imbalance.

When the load imbalance is low, the increase in the inclination of the antenna as a function of the load is lessened. In other words, when the adjacent cell loads are balanced, the antenna of one of these cells is moved away less from its optimum inclination when its load increases. This lessening can even result in there being no change in inclination when the loads on adjacent cells are balanced.

On the other hand, when the load imbalance increases, the increase in the inclination of the antenna as a function of the load is amplified. Advantageously, this amplification is proportional to a factor representing the load imbalance.

The load imbalance can be estimated by the exchange of information between the base stations, for example via a centralisation system.

According to another aspect of the present invention, the dynamic cell load estimation step estimates the load of the cell from the parameters peculiar to the base station.

The parameters peculiar to the base station can be a total transmission power level of the antenna, a total throughput of information transmitted by the antenna or a number of signals to be transmitted in the cell.

BRIEF DESCRIPTION OF THE DRAWINGS

The characteristics of the invention mentioned above, as well as others, will emerge more clearly from a reading of the following description of an example embodiment, the description being given in relation to the accompanying drawings, amongst which.

DETAILED DESCRIPTION OF THE INVENTION

Figure 3:
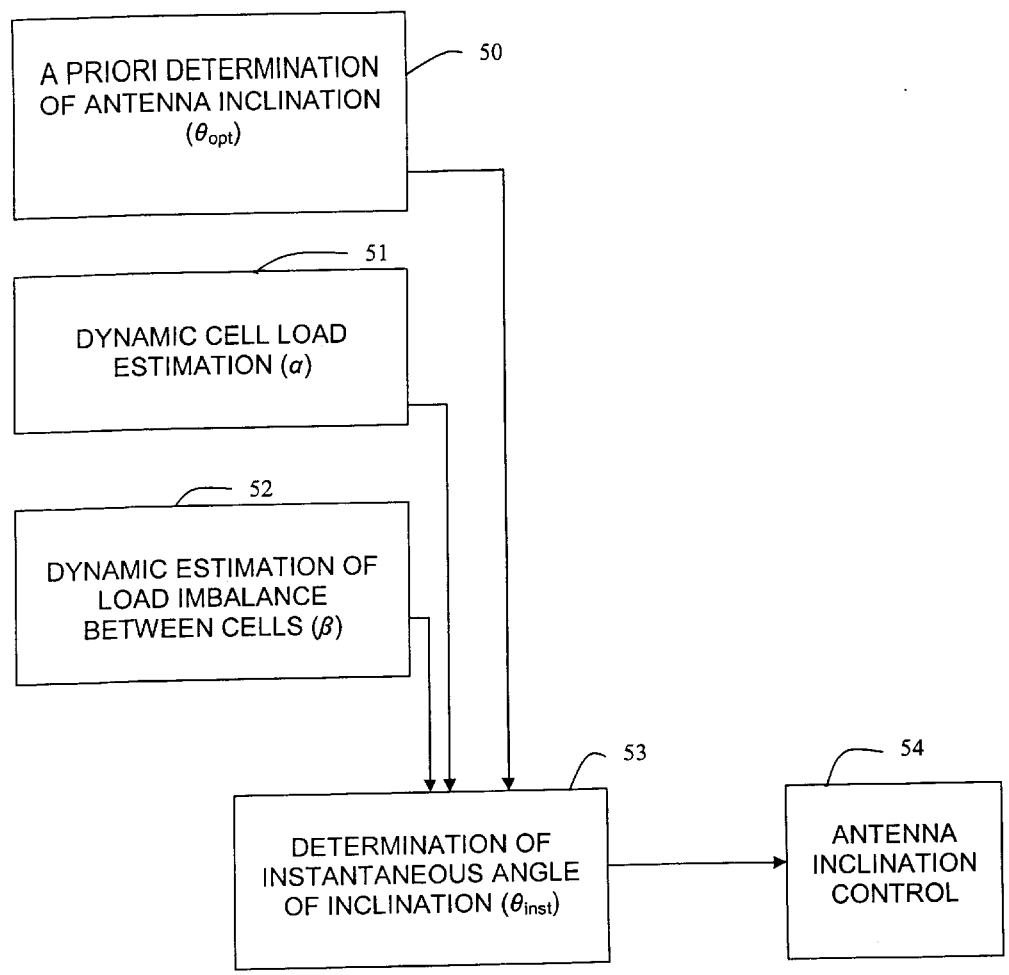
FIG. 3 is a flow diagram illustrating the basic principle of an embodiment of an antenna inclination control method according to the present invention.

The embodiment of the present invention depicted in FIG. 3 applies to a radiotelecommunication system, notably of the cellular mobile radiotelephony systems type, including, in a known manner, a plurality of fixed base stations communicating with a plurality of mobile units, each of the base stations defining a cell and having a transmission and reception antenna whose beam covers a sector in which the mobile units can communicate with the base station.

Figure 2:
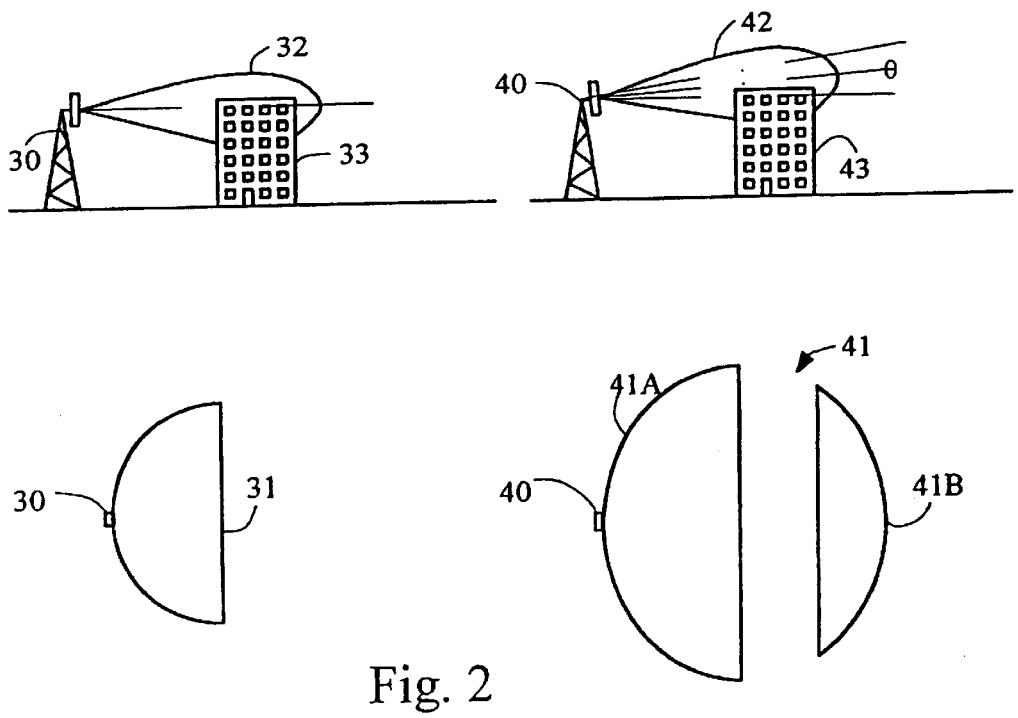
FIG. 2 is a diagram illustrating the impact of an upward inclination of an antenna on the coverage of a cell.

As is well known, the antenna can be inclined so as to modify the sector covered. FIGS. 2 and 3 illustrate the impact of a downward and upward inclination of the antenna on the cell coverage, as described above.

Overall, with reference to FIG. 3, a dynamic antenna inclination control method according to one embodiment of the present invention includes a step 50 of a priori determination of antenna inclination, a dynamic cell load estimation step 51, a step 52 of dynamic estimation of load imbalance between cells, an instantaneous angle of inclination determination step 53 and an antenna inclination control step 54.

Figure 1:
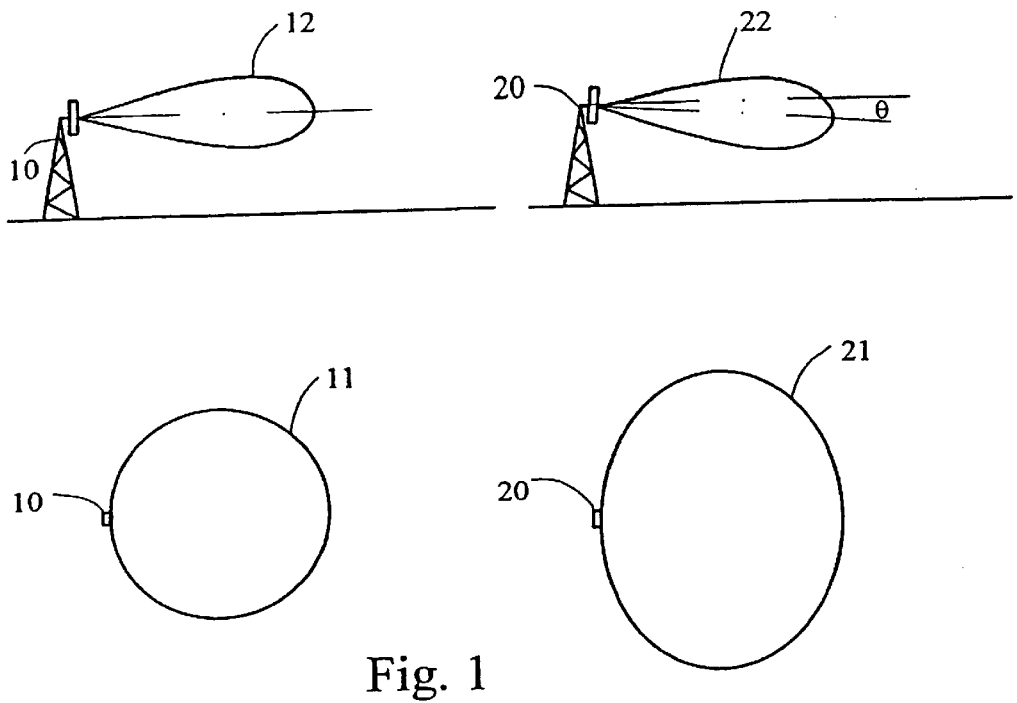
FIG. 1 is a diagram illustrating the impact of a downward inclination of an antenna on the coverage of a cell.

Step 50 consists of determining an a priori optimum inclination $\theta_{opt}$ of the antenna. This optimum inclination $\theta_{opt}$ is such that the beam of the antenna covers a maximum geographical area. When there is no obstacle close to the antenna, the optimum inclination $\theta_{opt}$ will generally be zero, that is to say the angle of inclination of the main beam with respect to the horizontal will be zero. In other words, the axis of the main beam will be horizontal. Thus, in the example of FIG. 1, the antenna 10, directed horizontally, covers the sector 11, which is larger than the sector 21 covered by the antenna 20, inclined downwards. When there is an obstacle close to the antenna, the optimum inclination $\theta_{opt}$ may be negative, that is to say the main beam will be inclined upwards, as is the case with the beam 42 depicted in FIG. 2. As is well known, this optimum inclination $\theta_{opt}$ can be determined a priori from knowledge of the topology of the environment of the antenna and conventional radio propagation study means.

The dynamic cell load estimation step 51 consists of estimating a cell load at a given instant. This load depends notably on the number of users present at this instant in the cell. This estimation can take place continuously so as to be able to be used at any instant. It can also be made at regular intervals or at certain predetermined moments. This estimation is made from parameters peculiar to the said base station, such as the total transmission power level of the antenna, the total throughput of information transmitted by the antenna or the number of signals to be transmitted in the cell. From step 51 a dynamic parameter β representing the cell load emerges. It lies between 0, which represents an empty cell, and 1, which represents a full cell, that is to say one supporting a maximum load.

The step 52 of dynamic estimation of load imbalance between cells consists of estimating, in parallel to the load estimation carried out by step 51, a load imbalance between the cell under consideration and adjacent cells. This load imbalance can be estimated by the exchange of information between the base stations, for example via a centralisation system. A dynamic parameter α, which represents the load imbalance between cells, emerges from step 52. It lies between 0, which represents a load balance, and 1, which represents a strong load imbalance.

The instantaneous angle of inclination determination step 53 consists of determining, from the a priori parameter $\theta_{opt}$ determined by step 50 and the dynamic parameters α and β determined by steps 51 and 52, an instantaneous angle of inclination $\theta_{inst}$.

In the present example embodiment, this determination is carried out by calculation, applying the following formula:

$$\theta_{inst}=\theta_{opt}(1+\alpha(f(\beta)-1)) \qquad (1)$$

where f(β) is an increasing function of β which is equal to 1 when β is zero.

The antenna inclination control step 54 consists of controlling the inclination of the said antenna so that the axis of the main beam of the latter is inclined by an angle of $\theta_{inst}$ with respect to the horizontal.

Thus, initially, the inclination of the antenna is fixed at $\theta_{opt}$ determined a priori by step 50. When the radiotelecommunication system is in operation, steps 51 and 52 supply at step 53 the dynamic parameters α and β enabling it to calculate the angle $\theta_{inst}$. When the loads of a group of adjacent cells containing the cell under consideration are balanced, α is equal to zero and $\theta_{inst}=\theta_{opt}$. Likewise, when the load of the cell under consideration is zero or low, that is to say when the cell is empty or there are only a small number of users present, f(β) is equal to or very close to 1 and $\theta_{inst}$ is substantially equal to $\theta_{opt}$. When the number of users present on the cell increases, f(β) increases and consequently $\theta_{inst}$ increases in absolute value. That is to say, if the beam were initially horizontal or inclined downwards, it will incline still further downwards, and if the beam were initially inclined upwards, it will incline even further upwards. Because of this, the sector covered decreases for the cell under consideration, and it is for the surrounding cells to take over for the remote areas. This decrease in the sector covered is great when there is a high load imbalance amongst a group of adjacent cells comprising the cell under consideration. In this case α is high and the increase in $\theta_{inst}$ as a function of β is high. When the loads of the group of adjacent cells are more balanced, α is lower and the increase in $\theta_{inst}$ as a function of β is lessened. Naturally, when the load of the cell decreases, $\theta_{inst}$ approaches $\theta_{opt}$ and the sector covered increases once again.

What is claimed is:

1. A dynamic antenna beam inclination control method for a radiotelecommunication system, notably of the cellular mobile radiotelephony system type, the radiotelecommunication system including a plurality of fixed base stations communicating with a plurality of mobile units, each of the base stations defining a cell and having a transmission and reception antenna whose beam covers a sector in which the mobile units can communicate with the base station, the inclination of the antenna beam being varied so as to modify the sector covered, the method including:
   determining, a priori, an optimum inclination by determining an inclination of the antenna beam which is optimum in relation to the sector covered;
   estimating a cell load on the cell, at a given instant;
   computing an instantaneous inclination, at the given instant, as a function of the optimum antenna inclination and the estimated cell load; and
   controlling the inclination of the antenna beam as a function of the computed instantaneous inclination.

2. The dynamic antenna beam inclination control method for a radiotelecommunication system according to claim 1, wherein the instantaneous inclination is a multiple of the optimum inclination.

3. The dynamic antenna beam inclination control method for a radiotelecommunication system according to claim 1, characterised in that the inclination of the antenna beam tends towards the optimum inclination when the estimated load is low.

4. The dynamic antenna beam inclination control method for a radiotelecommunication system according to claim 3, characterised in that, the more the estimated load increases, the more the inclination of the antenna beam moves away from the optimum inclination and a horizontal inclination.

5. The dynamic antenna beam inclination control method for a radiotelecommunication system according to one of claims 1–2, characterised in that the cell load estimation step estimates the cell load from a total transmission power level of the antenna, a total throughput of information transmitted by the antenna, or a number of signals to be transmitted in the cell.

6. The dynamic antenna beam inclination control method for a radiotelecommunication system according to one of claims 1–3, further comprising:
   estimating a load imbalance between cells by estimating, at the given instant, the load imbalance between the cell and the adjacent cells,
   wherein the instantaneous inclination is computed also as a function of the estimated load imbalance.

7. The dynamic antenna beam inclination control method for a radiotelecommunication system according to claim 6, characterised in that the cell load estimation step estimates the cell load from a total transmission power level of the antenna, a total throughput of information transmitted by the antenna, or a number of signals to be transmitted in the cell.

8. The dynamic antenna beam inclination control method for a radiotelecommunication system according to claim 6, characterised in that, when the estimated load imbalance increases, the increase in the inclination of the antenna beam as a function of the estimated load is amplified proportional to a factor representing the estimated load imbalance.

9. The dynamic antenna beam inclination control method for a radiotelecommunication system according to claim 8, characterised in that the cell load estimation step estimates the cell load from a total transmission power level of the antenna, a total throughput of information transmitted by the antenna, or a number of signals to be transmitted in the cell.

10. The dynamic antenna beam inclination control method for a radiotelecommunication system according to claim 6, characterised in that, when the estimated load imbalance decreases, the increase in the inclination of the antenna beam as a function of the estimated load is lessened.

11. The dynamic antenna beam inclination control method for a radiotelecommunication system according to claim 10, characterised in that the cell load estimation step estimates the cell load from a total transmission power level of the antenna, a total throughput of information transmitted by the antenna, or a number of signals to be transmitted in the cell.

12. The dynamic antenna beam inclination control method for a radiotelecommunication system according to claim 6, wherein the instantaneous inclination is a multiple of the optimum inclination.

13. The dynamic antenna beam inclination control method for a radiotelecommunication system according to claim 12, wherein the instantaneous inclination $\theta_{inst}$ is determined from the function $$\theta_{inst}=\theta_{opt}(1+\alpha(f(\beta)-1)),$$

where a equals the estimated cell load, $\beta$ equals the estimated load imbalance, and $f(\beta)$ is an increasing function of $\beta$.

14. A dynamic antenna beam inclination control method for a radiotelecommunication system, notably of the cellular mobile radiotelephony system type, the radiotelecommunication system including a plurality of fixed base stations communicating with a plurality of mobile units, each of the base stations defining a cell and having a transmission and reception antenna whose beam covers a sector in which the mobile units can communicate with the base station, the antenna beam being able to be inclined so as to modify the sector covered, the method including:

determining, a priori, an optimum inclination by determining an inclination of the antenna beam which is optimum in relation to the sector covered;

estimating a cell load on the cell, at a given instant;

estimating a load imbalance between cells by estimating, at the given instant, the load imbalance between the cell and the adjacent cells;

determining an instantaneous inclination, at the given instant, as a function of the optimum inclination, the estimated cell load, and the estimated load imbalance; and controlling the inclination of the antenna beam based on the determined instantaneous inclination, wherein, when the estimated load imbalance decreases, the increase in the inclination of the antenna beam as a function of the estimated load is lessened.

15. The dynamic antenna beam inclination control method for a radiotelecommunication system according to claim 14, wherein, when the estimated load imbalance increases, the increase in the inclination of the antenna beam as a function of the estimated load is amplified proportional to a factor representing the estimated load imbalance.

16. The dynamic antenna beam inclination control method for a radiotelecommunication system according to claim 15, wherein the cell load estimation step estimates the cell load from a total transmission power level of the antenna, a total throughput of information transmitted by the antenna, or a number of signals to be transmitted in the cell.

* * * * *